United States Patent [19]

Trott

[11] Patent Number: 4,832,314

[45] Date of Patent: May 23, 1989

[54] ELECTROMAGNETICALLY ACTUATABLE FUEL INJECTION VALVE

[75] Inventor: Ulrich R. Trott, Kuerten, Fed. Rep. of Germany

[73] Assignee: Robert Bosch GmbH, Stuttgart, Fed. Rep. of Germany

[21] Appl. No.: 230,391

[22] Filed: Aug. 10, 1988

[30] Foreign Application Priority Data

Aug. 17, 1987 [DE] Fed. Rep. of Germany ....... 3727342

[51] Int. Cl.[4] .............................................. F16K 31/06

[52] U.S. Cl. ................................ 251/129.16; 239/585

[58] Field of Search ..................... 251/129.16; 239/585

[56] References Cited

U.S. PATENT DOCUMENTS 4,705,270 11/1987 Graser et al. .

4,711,397 12/1987 Lahiff .............................. 239/585 X 4,721,254 1/1988 Horn .......................... 251/129.16 X

FOREIGN PATENT DOCUMENTS 0026060 1/1981 European Pat. Off. .

1291766 10/1972 United Kingdom ........... 251/129.16

2744777 2/1985 United Kingdom .

*Primary Examiner*—Arnold Rosenthal

*Attorney, Agent, or Firm*—Edwin E. Greigg

[57] ABSTRACT

An electromagnetically actuatable fuel injection valve for fuel injection system in internal combustion engines having a ferromagnetic valve housing, a ferromagnetic core provided in it, on which a magnet coil is located, a plane valve seat embodied on a nozzle body and an armature, which at the same time is embodied as a closing element arranged to cooperate with the valve seat. For lateral guidance of the armature, an outer guide face is provided, which can axially slide on an inner guide face; the guide faces are located inside the armature. One of the guide faces is embodied on a guide device which is secured on the core and protrudes partway into the armature. The inner guide face has the shape of a sphere or a partial sphere; the outer guide face is cylindrical.

8 Claims, 3 Drawing Sheets

ELECTROMAGNETICALLY ACTUATABLE FUEL INJECTION VALVE

BACKGROUND OF THE INVENTION

The invention is based on an electromagnetically actuatable fuel injection valve as generically defined hereinafter. A fuel injection valve for fuel injection systems is already known (European Patent Application 0 026 060), in which the armature is in the form of a disk and simultaneously serves as a valve closing element. For radial guidance, the outer jacket face of the armature has rounded portions embodied in the form of a radius referred to the center of the armature. The rounded portions form a first guide face, which cooperates with a second guide face embodied in the bore of a spacer ring. A disadvantage of this known fuel injection valve is that the guidance of the armature takes place over a large circumference, so that there is also a large amount of friction during the armature movement. This causes delays in the armature movement. Furthermore, the production of the radii on the armature jacket face entails a high production cost, because the guidance is intended to function with as little play as possible.

OBJECT AND SUMMARY OF THE INVENTION

The fuel injection valve according to the invention offers the advantage over the prior art of accurate metering of the fuel quantity injected per opening stroke, because with the low-friction guidance of the armature, the armature can be switched precisely, with little switching hysteresis. Because the armature is guided over a smaller diameter, it can be operated with little radial play, so that the size of the magnetic working gaps remains largely constant.

A particular advantage of the fuel injection valve according to the invention is that the slight radial play of the armature also enables the actuation of the armature via a radially acting magnetic working gap. Armature guidance is advantageously effected on a guide face in the form of a sphere or partial sphere, which either is a component of the armature or is stationary and which enables armature mobility and in particular pivotability without shear force, yet without causing a pendulum motion. In particular, the use of a ball as the guide body permits very good armature guidance, especially since balls can be manufactured highly accurately at a low production cost.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
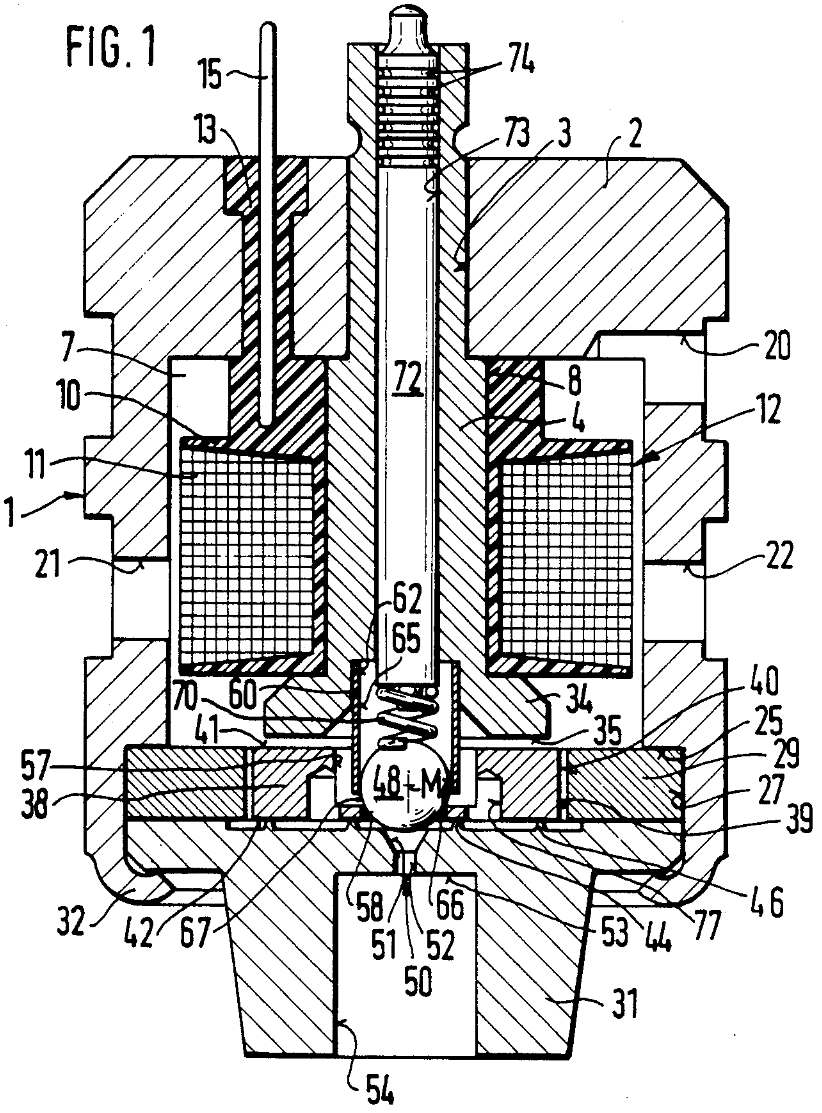
FIG. 1 is a complete cross sectional view of an electromagnetically actuatable fuel injection valve according to the invention.

The fuel injection valves for a fuel injection system shown in the drawing serve particularly to inject fuel into the intake tube of mixture-compressing internal combustion engines having externally supplied ignition.

The fuel injection valve shown in FIG. 1 has a primarily cup-shaped valve housing 1 of ferromagnetic material, the bottom 2 of which receives a ferromagnetic core 4 in a coaxial through bore 3. The core 4 coaxially protrudes through an interior 7 embodied in the cup-shaped valve housing 1 and on its circumferential surface 8 has a magnet coil 12 comprising a coil body 10 and a coil winding 11. The coil body 10 is fixed in its position by means of a fastening pin 13 protruding into the bottom 2 of the valve housing, and electrical connections 15 of the magnet coil 12 protrude through the fastening pin 13 to the outside of the fuel injection valve. The magnet coil 12 is secured with radial spacing inside the interior 7 of the valve housing 1, so that the coil can be flushed with fuel located inside the interior 7. Openings 20, 21, 22 connect the interior 7 to fuel delivery and removal lines, not shown.

Remote from the bottom 2, the valve housing 1 has a step 25, in the form of a plane end face, at which point the interior 7 widens into a receiving bore 27. Resting axially on the step 25 and radially in the receiving bore 27 is a ferromagnetic conducting ring 29 of predetermined thickness, which extends radially inward, and which is adjoined axially by a rotationally symmetrical nozzle body 31 that is likewise surrounded by the receiving bore 27. The housing rim 32 on the face end of the valve housing 1, which partly encompasses the outer region of the nozzle body 31, is achieved by rolling the rim 32 inwardly so that the nozzle body 31 is braced against the conducting ring 29 and the conducting ring is braced against the step 25 of the valve housing 1.

The core 4 which is oriented toward the nozzle 31 has a conically widened portion 34, which terminates in a first pole face 35 extending vertically to the longitudinal axis of the valve. The first pole face 35 forms a plane that is located just upstream of the plane defined by the step 25.

Located in the space formed between the first pole face 35, the nozzle body 31 and the conducting ring 29 is a cylindrical armature 38 in the form of a disk. 10 The inside diameter of the conducting ring 29 forms a second, annular pole face 39, which is located facing and spaced radially slightly apart from a circumferential face 40 of the armature 38. The thickness of the armature 38, measured between a first face end 41 oriented toward the first pole face 35 and a second face end 42 oriented toward the nozzle body 31, is approximately equivalent to the thickness of the conducting ring 29.

Upon excitation of the magnet coil 12, the armature 38 is attracted toward the magnet coil 12, so that it rests with its first face end 41 on the first pole face 35, which in this way limits the stroke of the armature 38. When the magnet coil 12 is not excited, the armature 38 rests with its second face end 42 on a valve seat 44, embodied on the nozzle body 31. The valve seat 44 is embodied as an annular, concentric protrusion in the form of a rib and is surrounded by a second, likewise annular, concentric rib 46. The annular valve seat 44 and the rib 46 may terminate in the same plane, located vertically to the longitudinal axis of the valve, and this plane then at the same time also forms the end face of the nozzle body 31 oriented toward the magnet coil 12, which is the end face resting on the conducting ring 29. Alternatively, it is equally possible for the annular rib 46 to be shifted farther back, i.e., it can be lower relative to valve seat 44 so that in the position of repose the armature 38 rests only on the valve seat 44. To attain good sealing action, the armature 38 is embodied as planar, at least in the vicinity of the valve seat. From a manufacturing standpoint, however, it is useful to embody the entire second face end 42 of the armature 38 in plane fashion, as shown in FIG. 1 (an exception would be a spherical guide body 48 in the armature 38, but this provision will be addressed hereinafter).

An ejection opening 50 is located centrally in the nozzle body 31 and has a conically narrowing portion 51 and, adjoining it downstream, a cylindrical portion 52. The cylindrical portion 52 of the ejection opening 50 discharges at the bottom 53 of a blind-bore-like preparation bore 54, which opens remote from the valve and may be embodied either cylindrically or in conically widening fashion.

According to the invention, the lateral guidance of the armature 38 is performed by the aforementioned spherical guide body 48, which is joined to the armature 38 for instance by soldering. A blind bore 57 opening toward the magnet coil 12 is coaxially machined into the armature 38; its diameter is greater than the diameter of the spherical guide body 48. From the blind bore 57, a coaxially machined bore 58 leads to the second face end 42 of the armature 38. The spherical guide body 48 is inserted centrally into this bore 58, filling up a large portion of the blind bore 57, and in the vicinity of the bore 58 is sealingly joined to the armature 38 all the way around it, for instance by soldering. Accordingly, the spherical guide body 48 is therefore larger than the diameter of the bore 58 and smaller than the diameter of the blind bore 57.

According to the invention, the geometry of the guide body 48 and that of the armature 38 are adapted to one another in such a way that the reference center point (M) for the radius of the guide body 48 is located in the center of the armature 38. At least, however, the reference center point (M) should be located between the planes defined by the first face end 41 and the second face end 42 of the armature 38. In the embodiment shown in FIG. 1, the reference center point (M) of the spherical guide body 48 is located precisely in the middle between the first face end 41 and the second face end 42 of the armature 38.

With very slight radial play, the guide body 48 is surrounded by a guide device 60, which in the embodiment shown in and described in conjunction with FIG. 1 is embodied as a cylindrical sheath, which is secured in a coaxial blind opening 62 protruding into the conically widened portion 34 of the core 4. While in its upstream portion the sheath 60 is secured with its circumference in the blind opening 62 of the core 4, for instance by means of a press fit, in its downstream portion the sheath 60 receives the guide body 48. An inner jacket face 65 of the sheath 60 embodied as a guide device forms an outer guide face 66, while an inner guide face 67 is defined by the spherical surface of the guide body 48. The guide faces 66, 67 extend toward one another with very little play and assure an axial mobility and pivotability of the guide body 48, and hence of the armature 38, relative to the guide device embodied as the sheath 60. The length of the sheath 60 is selected such that in the position of repose of the armature 38, it extends as far as a plane that is just downstream of the reference center point (M) of the guide body 48. That is, over a portion of its length, the sheath 60 protrudes into the blind bore 57 of the armature 38, yet contact between the armature 38 and the sheath 60 is still impossible, even when the magnet coil 12 is actuated.

Resting on the top of the spherical guide body 48 toward the magnet coil 12 is a spring 70 operating by compression, which on the other end is supported on a bar-like slide member 72, which is secured in an axial bearing bore 73 penetrating the core 4. To adjust the compressive force of the spring 70 exerted upon the armature 38, the slide member 72 is correspondingly axially fixed inside the bearing bore 73, which is done in a manner known per se by causing material comprising the core 4 to be secured in annular bracing grooves 74 of the slide member 72.

The guide body 48 need not necessarily be embodied as a complete sphere; instead, the essential factor is that the portion forming the inner guide face 67 be spherical, or in other words radially referred to the common reference center point (M). The guide body 48 may accordingly take the form of a partial sphere, a spherical segment or a spherical zone. The sole deciding factor is the location of the reference center point (M) relative to the face ends 41, 42 of the armature 38.

Located in the armature 38 are blind-bore-like flow openings 77, for instance extending axially, which lead from the second face end 42 into the armature 38 and establish a hydraulic connection from the blind bore 57 to the valve seat 44. The flow openings 77 discharge on the second face end 42 outside the region of the annular valve seat 44, in particular between the valve 10, seat 44 and the rib 46, and on the other end partly intersect the blind bore 57, and are advantageously disposed outside the vicinity of the greatest magnetic flux in the armature 83.

OPERATION

Upon electrical triggering of the magnet coil 12, the magnetic flux extends from the core 4 via the bottom 2 of the valve housing 1 to the valve housing 1, from there via the conducting ring 29 and the second pole face 39 to the armature 38 and via the first pole face 35 back to the core 4. The armature 38 is attracted counter to the force of the spring 70 until it rests on the first pole face 35, and on its underside it opens up a valve cross section between its second face end 42 and the annular valve seat 44; as a result, fuel flows via the opened valve cross section to reach the ejection opening 50 and from there emerges into the preparation bore 54. The lateral guidance of the armature 38 is performed by the spherical guide body 48, which with its inner guide face 67 slides on the outer guide face 66 of the sheath 60.

Figure 2:
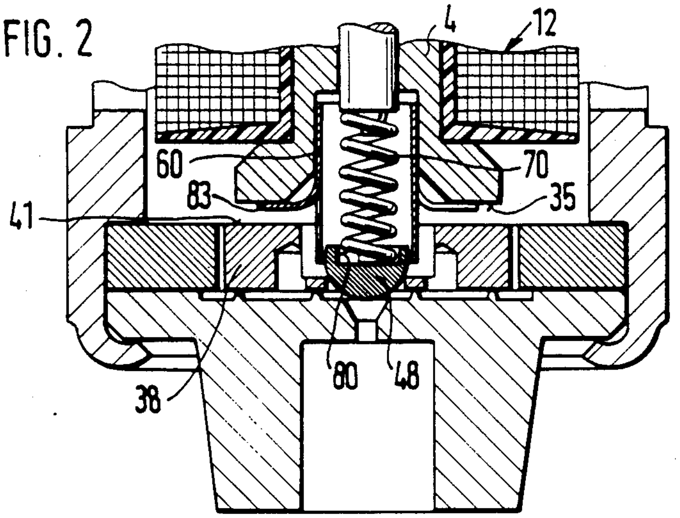
FIGS. 2-5 are partial sectional views of further electromagnetically actuatable valves according to the invention.

FIG. 2 shows a second exemplary embodiment of the invention. Components having the same function are identified by the same reference numerals, as in FIGS. 3–5 as well. The guide body 48 here is embodied not as a complete sphere but rather as a partially spherical guide body, in particular a spherical segment. Located in the guide body 48 is a blind bore recess 80, which is open toward the magnet coil 12 and on the bottom of which the spring 7 is supported. Advantageously, the blind bore recess 80 protrudes as far as possible into the guide body 48, so that the engagement point for the force of the spring 70 is deep inside it.

The guide device 60 which is also embodied as a sheath is longitudinally slit adjacent to its downstream portion, producing radially extending portions every other one of which is folded over at a right angle. Accordingly, with these portions arranged to extend radially outward, during manufacture; there is produced a star-shaped stop 83, resting on the first pole face 35 and on which the armature 38 rests when the magnet coil 12 is actuated. This stop 83, like the guide device 60, is nonmagnetic and serves as a remnant air disk, which when the armature 38 is attracted maintains a remnant air gap of defined thickness between the first pole face 35 and the first face end 41 of the armature 38.

Figure 3:
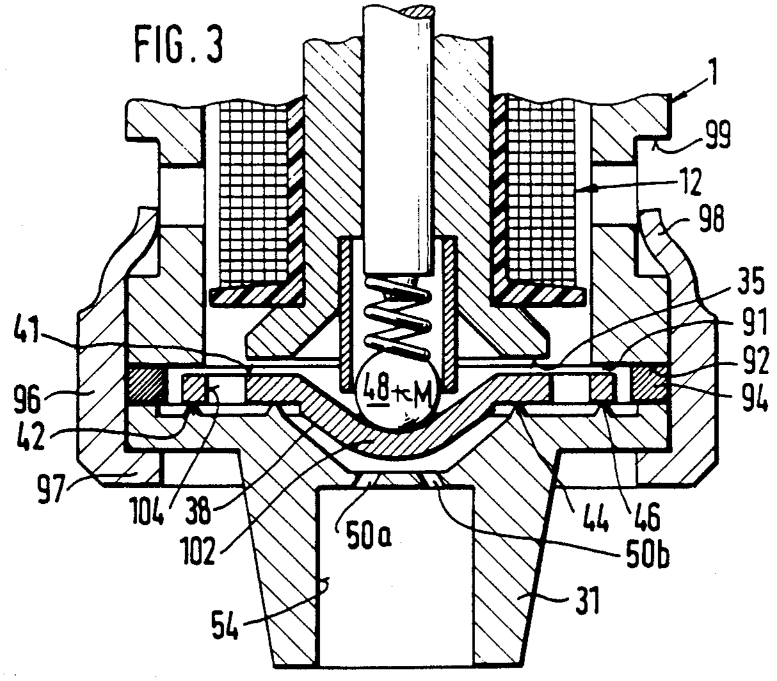

A third exemplary embodiment of the invention is shown in FIG. 3. The basic difference from the foregoing exemplary embodiments is that the second, radially acting pole face inside the conducting ring is omitted; instead, there is a second, axially oriented pole face 91 on a face-end bearing face 92 of the valve housing 1. Upon excitation of the magnet coil 12, the armature 38 presses with an outer portion of its first face end 41 against this second, axially oriented pole face 91. The ferromagnetic conducting ring of the first two exemplary embodiments is replaced here by a spacer ring 94, the only function of which is to limit the armature stroke, by maintaining a predetermined distance between the face-end bearing face 92 and the nozzle body 31. Differing from the first two embodiments, the bracing of the valve housing 11 spacer ring 94 and nozzle body 31 is effected here by means of a retaining ring 96, which with an edge 97 surrounds an outer portion of the nozzle body 31 and on the other side, with crimped-in portions 98, engages a circumferential groove 99 of the valve housing 1.

The armature 38 is primarily platelike in embodiment, but it has a central depression 102 of V-shaped cross section, in the lowermost point of which the guide body 48 is secured, for instance by soldering. The portion of the armature 38 located outside the depression 102 has the aforementioned plane face ends 41, 42, which define planes between which the reference center point (M) of the guide body 48 is located. The armature 38 can be economically manufactured as a bent component, and the second face end 42 of the armature 38, which faces downstream, can be subjected to a special planishing during manufacture, to assure a satisfactory seat of the armature 38 on the annular valve seat 44 and annular rib 46.

With the fuel injection valve opened, the fuel flows via a plurality of ejection openings 50*a, b*, which may also have an inclined course (with a radial and/or tangential component), to reach the preparation bore 54.

The armature 38 is provided with flow connections 104 extending axially or on an incline, which begin in the region between the first pole face 35 and the second pole face 91 and discharge in the region between the valve seat 44 and the rib 46.

Figure 4:
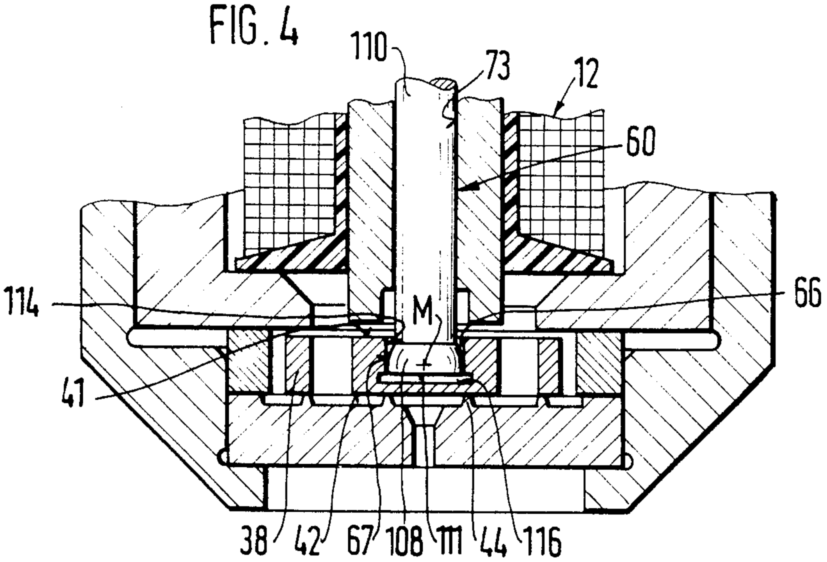

In FIG. 4, a further exemplary embodiment of the invention is shown. In contrast to the foregoing exemplary embodiments, here the outer guide face 66 is embodied on the armature 38 and the inner guide face 67 is embodied on the guide device 60. The guide device 60 comprises a spherical head 108, the jacket face of which represents the inner guide face 67, and a rod 110 coaxially joined to the spherical head 108; this rod 110 is retained in the bearing bore 73, for instance by means of a press fit. Toward the valve seat 44, the guide device 60 has a flattened portion 111. The outer guide face 66 is defined by the cylindrical jacket face of a blind-bore-like guide bore 114 machined coaxially into the armature 38. The blind-bore-like guide bore 114 opens toward the magnet coil 12, and is made deep enough so that when the armature 38 is attracted, a base 116 of the guide bore 114 barely misses abutting the flattened portion 111 on the spherical head 108 of the guide device 60. In accordance with the invention, the diameter of the inner guide face 67 on the guide device 60 is slightly smaller than the diameter of the outer guide face 66 on the armature 38, so that the armature 38 can slide axially on the guide device 60 and still remain rotatable and pivotable. The reference center point (M) to which the radii of the spherical head 108 of the guide device 60 are referred is once again, in this exemplary embodiment, naturally located between the planes defined by the face ends 41, 42 of the armature 38.

Figure 5:
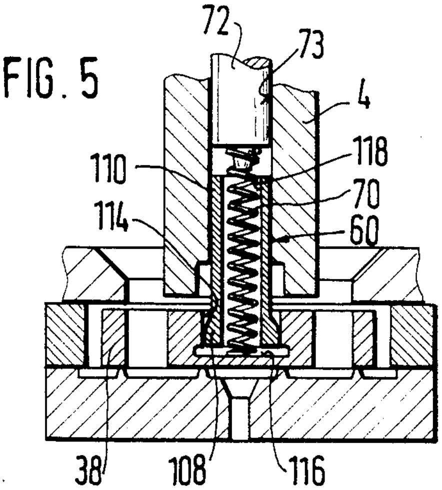

While the opening of the fuel injection valve is done electromagnetically, the unequal pressure of the fuel or of the atmosphere exerted upon the two face ends 41, 42 of the armature 38 can be utilized for its closure. However, as shown in FIG. 5, it is also possible to reinforce the closing movement of the armature 38 by means of the spring 70 described above. To this end, the guide device 60 is provided with a longitundinal central bore 118, and the spring 70 which rests on one end on the base 116 of the blind-bore-like guide bore 114, also passes through the central bore 118, and on the other end is supported on the adjustable slide member 72 that is secured in the bearing bore 73 of the core 4.

The described guidance of the armature 38 functions with only a little radial play, yet the free rotatability and in particular pivotability of the armature is completely assured. By means of the outer and inner guide faces 66 and 67 disposed on a small radius, the armature 38 is guided with very little friction and largely free of frictional moments, which more precisely increases the switching speed of the fuel injection valve.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve for fuel injection systems for internal combustion engines, comprises a valve housing of ferromagnetic material (1), at least one magnet coil (12) on a core (4) of ferromagnetic material and a cylindrical armature (38) on which a first face end (41) is embodied, with which, when the magnet coil (12) is actuated, the armature (38) rests on a stop face (35) firmly attached to the housing, said armature further including a second face end (42), with which, when the magnet coil is not excited, the armature (38) rests sealingly on a valve seat (44), said second face end (42) being substantially planar, in the vicinity of the valve seat (44), and further for radial guidance of the armature (38) a cylindrical outer guide face (66) is provided, and cooperating therewith, an inner guide face (67), each point of which has the same spacing, from a common reference center point M located between said two face ends, (41) and (42) in which the diameter of the guide faces (66, 67) is smaller than the diameter of the armature (38), and one of the guide faces (66, 67) is embodied on a guide device (60) connected to the core (4), which guide device protrudes through the first face end (41).

2. A fuel injection valve as defined by claim 1, in which the outer guide face (66) is embodied as an inner jacket face (65) of the guide device (60), and the inner guide face (67) is embodied on a guide body (48) joined to the armature (38), (FIGS. 1–3) , 3. A fuel injection valve as defined by claim 2, in which the guide device (60) is embodied as a cylindrical sheath.

4. A fuel injection valve as defined by claim 3, in which the sheath (60) comprises a nonmagnetic material.

5. A fuel injection valve as defined by claim 4, in which the sheath (0) is provided with at least one stop (83) which is adapted to extend radially outward, so as to rest on a first pole face (35) and on which, when the magnet coil (12) is actuated, the armature (38) will also rest. (FIG. 2)

6. A fuel injection valve as defined by claim 1, in which the outer guide face (66) is embodied as a guide bore (114) in the armature (38), and the inner guide face (67) is embodied on a jacket face of the guide device (60) (FIGS. 4 and 5).

7. A fuel injection valve as defined by claim 1, in which the armature (38) is surrounded by a second pole face (39) whereby when the magnet coil (12) is actuated, the magnetic flux proceeds between the second pole face (39) and a circumferential face (40) of the armature (38).

8. A fuel injection valve as defined by claim 7, in which flow openings (77) in the armature (38), are located outside the region of the greatest magnetic flux.

* * * * *